US010907500B2

(12) United States Patent
Wong et al.

(10) Patent No.: US 10,907,500 B2
(45) Date of Patent: Feb. 2, 2021

(54) HEAT EXCHANGER SYSTEM WITH SPATIALLY VARIED ADDITIVELY MANUFACTURED HEAT TRANSFER SURFACES

(71) Applicant: UNITED TECHNOLOGIES CORPORATION, Hartford, CT (US)

(72) Inventors: Eva Wong, Glastonbury, CT (US); John H Whiton, South Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 533 days.

(21) Appl. No.: 14/615,753

(22) Filed: Feb. 6, 2015

(65) Prior Publication Data

US 2016/0230595 A1 Aug. 11, 2016

(51) Int. Cl.
  *F01D 25/12* (2006.01)
  *F28F 3/02* (2006.01)
  *F28F 3/04* (2006.01)
  *B23P 15/26* (2006.01)
  *F28D 21/00* (2006.01)

(52) U.S. Cl.
  CPC .............. *F01D 25/12* (2013.01); *B23P 15/26* (2013.01); *F28F 3/02* (2013.01); *F28F 3/04* (2013.01); *F28D 2021/0021* (2013.01); *F28F 2215/04* (2013.01)

(58) Field of Classification Search
  CPC .................. F28D 9/0062; F28D 9/0068; F28D 2021/0021; F28F 2255/00; F28F 3/02; F28F 3/04; F28F 2215/04; F01D 25/12; B23P 15/26

USPC .................................. 165/165, 166, 146
See application file for complete search history.

(56) References Cited

U.S. PATENT DOCUMENTS

| | | | |
|---|---|---|---|
| 3,475,906 A * | 11/1969 | Madelung ................. | F02C 7/14 60/785 |
| 4,623,019 A | 11/1986 | Wiard | |
| 4,645,415 A * | 2/1987 | Hovan .................. | F01D 25/125 415/115 |
| 5,123,242 A * | 6/1992 | Miller ....................... | F02C 6/08 60/226.1 |
| 5,269,133 A | 12/1993 | Wallace | |
| 5,269,135 A * | 12/1993 | Vermejan .................. | F02C 7/14 60/226.1 |
| 5,729,969 A * | 3/1998 | Porte ......................... | F02C 6/08 60/226.1 |

(Continued)

FOREIGN PATENT DOCUMENTS

| | | |
|---|---|---|
| DE | 10 2008 033 302 | 1/2010 |
| WO | 2009/154543 | 12/2009 |
| WO | 2014/200588 | 12/2014 |

OTHER PUBLICATIONS

European search report for Application No. 16154515.7 dated Jun. 10, 2016.

*Primary Examiner* — Ljiljana V. Ciric
(74) *Attorney, Agent, or Firm* — Bachman & LaPointe, P.C.

(57) ABSTRACT

A heat exchanger system includes a plurality of additively manufactured heat transfer surfaces in a plurality of sectors, a first of the plurality of sectors including a first subset of the plurality of the additively manufactured heat transfer surfaces having a characteristic different than a characteristic in a second of the plurality of sectors.

10 Claims, 7 Drawing Sheets

(56) References Cited

U.S. PATENT DOCUMENTS

| | | | |
|---|---|---|---|
| 6,058,696 A | 5/2000 | Nikkanen et al. | |
| 6,106,229 A | 8/2000 | Nikkanen et al. | |
| 6,293,338 B1* | 9/2001 | Chapman et al. | F28D 9/0018 165/166 |
| 6,698,687 B2 | 3/2004 | Daggett | |
| 6,773,225 B2* | 8/2004 | Yuri | F01D 5/08 415/1 |
| 6,789,614 B2 | 9/2004 | Sin et al. | |
| 7,387,489 B2* | 6/2008 | Appleby | F02K 3/075 415/144 |
| 7,398,641 B2 | 7/2008 | Stretton et al. | |
| 7,631,485 B2 | 12/2009 | Suciu et al. | |
| 7,797,945 B2* | 9/2010 | Appleby | F04D 27/0215 60/795 |
| 7,810,312 B2 | 10/2010 | Stretton et al. | |
| 7,810,552 B2 | 10/2010 | Slaughter | |
| 7,866,372 B2 | 1/2011 | Slaughter | |
| 7,866,377 B2 | 1/2011 | Slaughter | |
| 7,926,261 B2* | 4/2011 | Porte | F02C 6/08 60/266 |
| 7,971,438 B2 | 7/2011 | Taylor et al. | |
| 7,988,447 B2 | 8/2011 | Fowser et al. | |
| 7,997,062 B2 | 8/2011 | Sun et al. | |
| 8,181,443 B2 | 5/2012 | Rago et al. | |
| 8,387,362 B2* | 3/2013 | Storage | F28F 1/022 60/266 |
| 8,661,783 B2 | 3/2014 | Foster et al. | |
| 8,763,363 B2* | 7/2014 | Ranganathan | F01D 25/125 60/266 |
| 8,784,047 B2 | 7/2014 | Elder et al. | |
| 9,260,191 B2* | 2/2016 | Pollard | B64D 13/00 |
| 9,752,587 B2* | 9/2017 | Fishler | F04D 27/0215 |
| 9,797,297 B2* | 10/2017 | Thomassin | F02B 61/04 |
| 9,879,591 B2* | 1/2018 | Thomassin | F02C 7/052 |
| 10,436,115 B2* | 10/2019 | Duesler | F02C 6/12 |
| 10,634,054 B2* | 4/2020 | Schmitz | F02C 7/18 |
| 10,641,099 B1* | 5/2020 | Waite | F01D 5/187 |
| 10,641,122 B2* | 5/2020 | Lewis | F01D 25/10 |
| 10,670,345 B2* | 6/2020 | Jensen | F28F 9/001 |
| 10,677,069 B2* | 6/2020 | Devore | F01D 9/041 |
| 2002/0125001 A1* | 9/2002 | Kelly et al. | F28F 7/02 165/165 |
| 2003/0159814 A1 | 8/2003 | Sin et al. | |
| 2003/0218096 A1* | 11/2003 | Marche | B64D 13/00 244/118.5 |
| 2005/0098309 A1* | 5/2005 | Kang et al. | F28D 9/0018 165/166 |
| 2005/0150970 A1* | 7/2005 | Beutin | F02C 7/141 237/12 |
| 2005/0183851 A1* | 8/2005 | Kelly et al. | F28F 7/02 165/148 |
| 2005/0189097 A1 | 9/2005 | Fowser et al. | |
| 2006/0245987 A1* | 11/2006 | Schmidt | F28F 13/003 422/198 |
| 2008/0047700 A1 | 2/2008 | Fowser et al. | |
| 2008/0053099 A1* | 3/2008 | Venkataramani | F02C 7/14 60/772 |
| 2008/0149313 A1* | 6/2008 | Slaughter | B22F 3/1055 165/148 |
| 2008/0230651 A1* | 9/2008 | Porte | B64D 13/06 244/118.5 |
| 2009/0097972 A1* | 4/2009 | Murphy | F02C 7/224 415/178 |
| 2009/0211977 A1* | 8/2009 | Miller | B01D 63/082 210/646 |
| 2010/0025026 A1 | 2/2010 | Dietz et al. | |
| 2011/0132570 A1 | 6/2011 | Wilmot | |
| 2011/0139419 A1 | 6/2011 | Blomgren et al. | |
| 2011/0315813 A1* | 12/2011 | Rinjonneau | B64D 33/10 244/54 |
| 2012/0128467 A1* | 5/2012 | Ruthemeyer | F01D 5/146 415/115 |
| 2012/0152501 A1* | 6/2012 | Harvey et al. | F28F 9/026 165/109.1 |
| 2012/0168115 A1* | 7/2012 | Raimarckers | F01D 25/02 165/41 |
| 2012/0216506 A1* | 8/2012 | Eleftheriou | F28D 21/001 60/39.511 |
| 2012/0216543 A1* | 8/2012 | Eleftheriou | F02C 7/08 60/772 |
| 2012/0216544 A1* | 8/2012 | Eleftheriou | F02C 7/143 60/772 |
| 2012/0272658 A1* | 11/2012 | Murphy | F01D 17/085 60/783 |
| 2013/0236299 A1* | 9/2013 | Kington | F02C 7/08 415/177 |
| 2014/0030074 A1* | 1/2014 | Roberge | F02K 1/822 415/182.1 |
| 2014/0116664 A1* | 5/2014 | Landre | F28F 3/025 165/166 |
| 2014/0140829 A1* | 5/2014 | Blair | F02C 7/14 415/177 |
| 2014/0360698 A1* | 12/2014 | Waldman | B22F 3/1055 165/81 |
| 2015/0047367 A1* | 2/2015 | Benignos | F02C 7/143 60/782 |
| 2015/0114611 A1* | 4/2015 | Morris | F02C 7/10 165/166 |
| 2015/0321765 A1* | 11/2015 | Brochard | B64D 27/26 244/54 |
| 2015/0377135 A1* | 12/2015 | Kupiszewski | F28D 7/10 60/806 |
| 2016/0033129 A1 | 2/2016 | Burd | |
| 2016/0108813 A1* | 4/2016 | Schmitz | F02C 7/10 60/39.511 |
| 2016/0108814 A1* | 4/2016 | Schmitz | B23P 15/26 60/39.511 |
| 2016/0108815 A1* | 4/2016 | Schmitz | F28D 1/0476 165/51 |
| 2016/0231064 A1* | 8/2016 | Kironn | F28F 1/025 |
| 2016/0231068 A1* | 8/2016 | Schmitz | F28F 9/02 |
| 2017/0335690 A1* | 11/2017 | Golan | F01D 5/08 |
| 2018/0142971 A1* | 5/2018 | McCaffrey | F01D 25/12 |
| 2020/0173307 A1* | 6/2020 | Roberge | F28F 13/12 |

* cited by examiner

HEAT EXCHANGER SYSTEM WITH SPATIALLY VARIED ADDITIVELY MANUFACTURED HEAT TRANSFER SURFACES

BACKGROUND

The present disclosure relates to heat exchangers and, more particularly, to additively manufactured, spatially varied, heat transfers surfaces.

Gas turbine engines, such as those that power modern commercial and military aircraft, typically include a ducted heat exchanger system with a heat exchanger and associated equipment to exchange engine heat with airflow. The gas turbine engine architecture typically dictates the ducted heat exchanger placement within a nacelle that encloses the engine.

Conventional heat exchangers have uniform internal and external geometries due in part to the complexity of manufacture. Although effective, the heat exchanger may be subject to local stress concentrations or other structural requirements that drive material thicknesses and geometry for the heat transfer surfaces. This may result in increased weight and cost. The heat transfer surfaces are typically spatially uniform, however, as the fluids exchange heat, the fluid properties change. Spatially uniform heat transfer surfaces are thereby sized for average conditions and may not allow for optimal heat transfer as the fluid properties change.

SUMMARY

A heat exchanger system according to one disclosed non-limiting embodiment of the present disclosure includes a plurality of additively manufactured heat transfer surfaces in a plurality of sectors, a first of the plurality of sectors including a first subset of the plurality of additively manufactured heat transfer surfaces having a characteristic different than a characteristic of a second subset of the plurality of additively manufactured heat transfer surfaces in a second of the plurality of sectors.

A further embodiment of the present disclosure includes, wherein the characteristic is a height.

A further embodiment of any of the foregoing embodiments of the present disclosure includes, wherein the characteristic is a thickness.

A further embodiment of any of the foregoing embodiments of the present disclosure includes, wherein the characteristic is an aspect ratio.

A further embodiment of any of the foregoing embodiments of the present disclosure includes, wherein the characteristic is a number.

A further embodiment of any of the foregoing embodiments of the present disclosure includes, wherein the characteristic is a shape.

A further embodiment of any of the foregoing embodiments of the present disclosure includes, wherein the shape that provides structural support.

A further embodiment of any of the foregoing embodiments of the present disclosure includes, wherein the plurality of additively manufactured heat transfer surfaces is within a single flow passage of the heat exchanger.

A further embodiment of any of the foregoing embodiments of the present disclosure includes, wherein the single flow passage is curved.

A further embodiment of any of the foregoing embodiments of the present disclosure includes, wherein the heat exchanger is curved.

A further embodiment of any of the foregoing embodiments of the present disclosure includes, wherein the first of the plurality of sectors includes a corner of the heat exchanger.

A further embodiment of any of the foregoing embodiments of the present disclosure includes, wherein the first of the plurality of sectors includes a corner of the heat exchanger, the first subset of the plurality of additively manufactured heat transfer surfaces are low aspect ratio heat transfer surfaces.

A heat exchanger system according to another disclosed non-limiting embodiment of the present disclosure includes a first flow passage with a first plurality of additively manufactured heat transfer surfaces in a first plurality of sectors; and a second flow passage with a second plurality of additively manufactured heat transfer surfaces in a second plurality of sectors, at least one of the second plurality of sectors including a second plurality of additively manufactured heat transfer surfaces having a characteristic different than a first plurality of additively manufactured heat transfer surfaces in the first flow passage.

A further embodiment of any of the foregoing embodiments of the present disclosure includes, wherein the characteristic is a height.

A further embodiment of any of the foregoing embodiments of the present disclosure includes, wherein the characteristic is a thickness.

A further embodiment of any of the foregoing embodiments of the present disclosure includes, wherein the characteristic is an aspect ratio.

A further embodiment of any of the foregoing embodiments of the present disclosure includes, wherein the characteristic is a number.

A method of manufacturing a heat exchanger system according to another disclosed non-limiting embodiment of the present disclosure includes additively manufacturing a plurality of heat transfer surfaces to vary a geometry of the plurality of heat transfer surfaces throughout the heat exchanger system to maintain a consistent flow rate through the heat exchanger system.

A further embodiment of any of the foregoing embodiments of the present disclosure includes additively manufacturing the plurality of heat transfer surfaces to form a curved heat exchanger system.

A further embodiment of any of the foregoing embodiments of the present disclosure includes additively manufacturing the plurality of heat transfer surfaces in a plurality of sectors, a first of the plurality of sectors including a first subset of the plurality of the additively manufactured heat transfer surfaces having a characteristic different than a characteristic of a second subset of the plurality of additively manufactured heat transfer surfaces in a second of the plurality of sectors.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
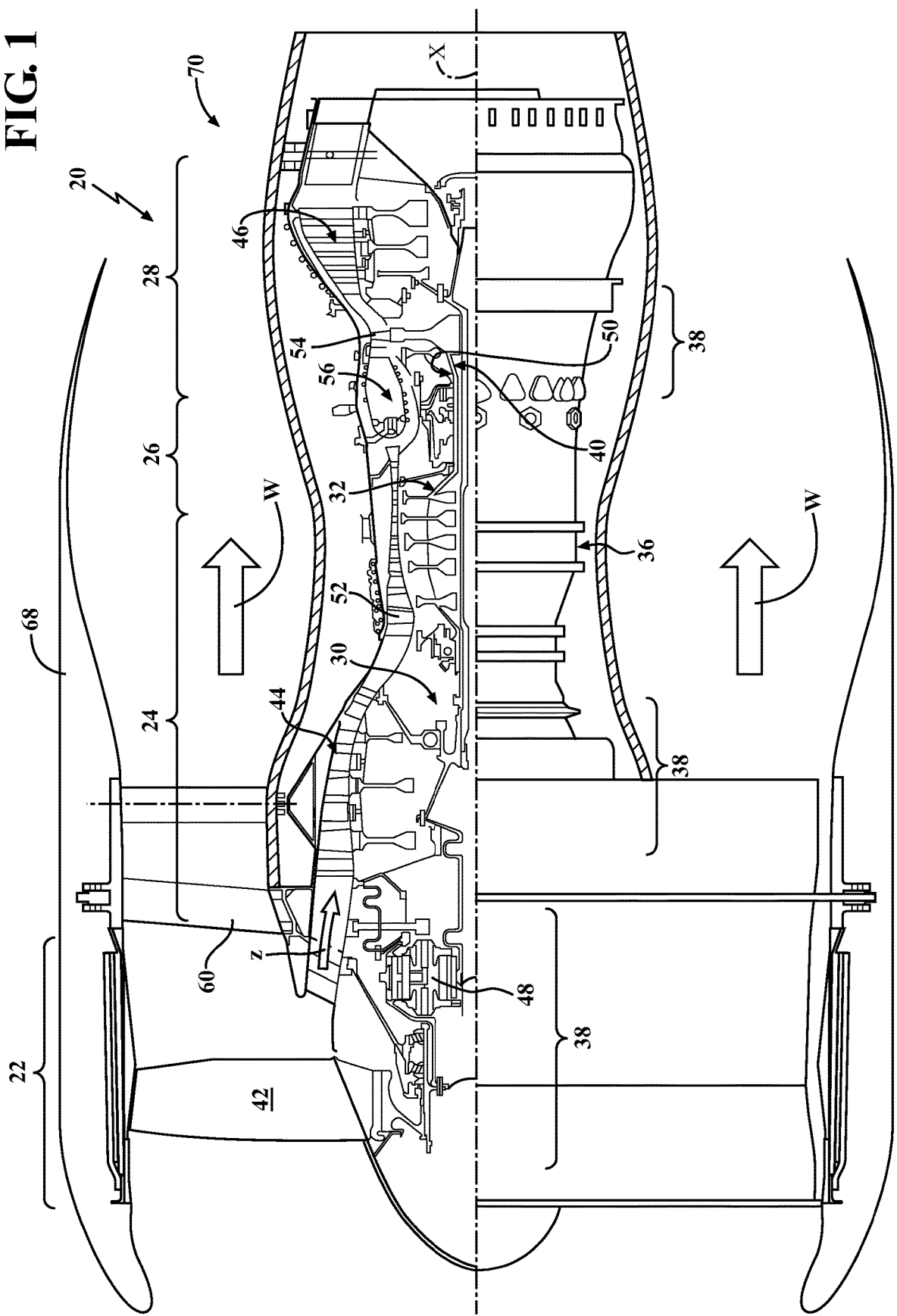
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) architectures.

The engine 20 generally includes a low spool 30 and a high spool 32 mounted for rotation about an engine central longitudinal axis relative to an engine case structure 36. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric, and rotate about the engine central longitudinal axis.

Core airflow is compressed by the LPC 44, then the HPC 52, mixed with the fuel and burned in the combustor 56, then expanded over the HPT 54 and the LPT 46 along a core flowpath "Z". The LPT 46 and HPT 54 rotationally drive the respective low spool 30 and high spool 32 in response to the expansion. The main engine shafts 40, 50 are supported at a plurality of points by bearing systems 38 within the case structure 36.

Figure 2:
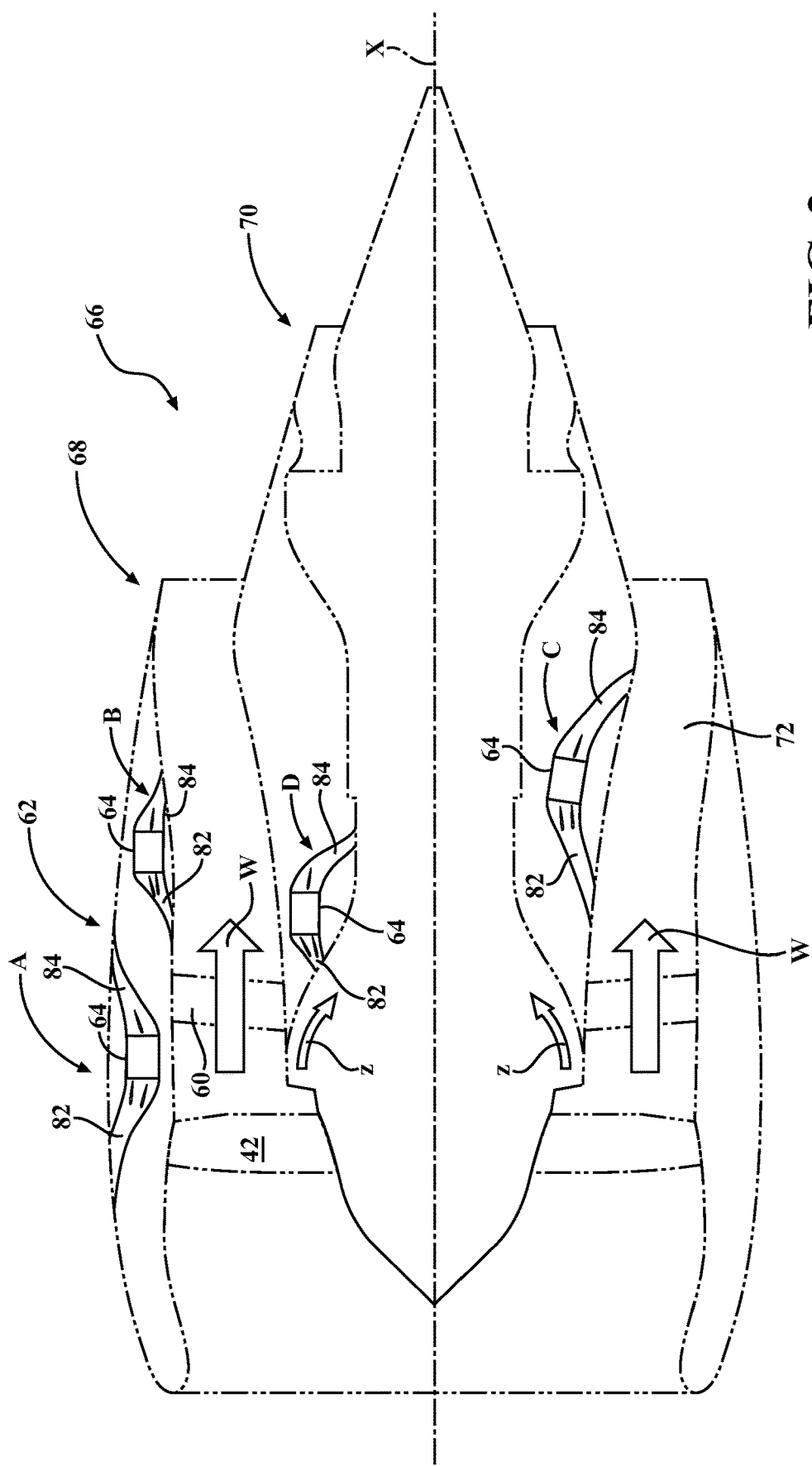
FIG. 2 is a schematic view of a nacelle assembly with a multiple of example locations for a ducted heat exchanger system that exchange flows with a common air stream.

With reference to FIG. 2, the fan 42 drives air along a fan bypass flowpath, "W" past a Fan Exit Guide Vane system 60. A ducted heat exchanger system 62 includes an additive manufactured heat exchanger 64 that may be at least partially integrated into a nacelle assembly 66 such as a fan nacelle 68, a core nacelle 70, a bifurcation 72, the Fan Exit Guide Vane system 60 or any combination thereof but still considered as in communication with the fan bypass flowpath W as defined herein. It should be appreciated that although a nacelle assembly 66 will be utilized in the illustrated embodiment, various other environments may also be used to contain the ducted heat exchanger system 62.

The additive manufactured heat exchanger 64 may locate an inlet 82 and an exit 84 in communication with the same air stream. For example, the inlet 82 and exit 84 may be located within the fan nacelle 68 for communication with a free stream airflow (illustrated schematically as position A); within the fan nacelle 68 for communication with a bypass stream airflow through the fan bypass flowpath "W" (illustrated schematically as position B); within the core nacelle 70 for communication with the bypass stream airflow (illustrated schematically as position C); and/or with the core engine (illustrated schematically as position D). It should be appreciated that various positions and flow paths may be alternatively, or additionally, provided.

Figure 3:
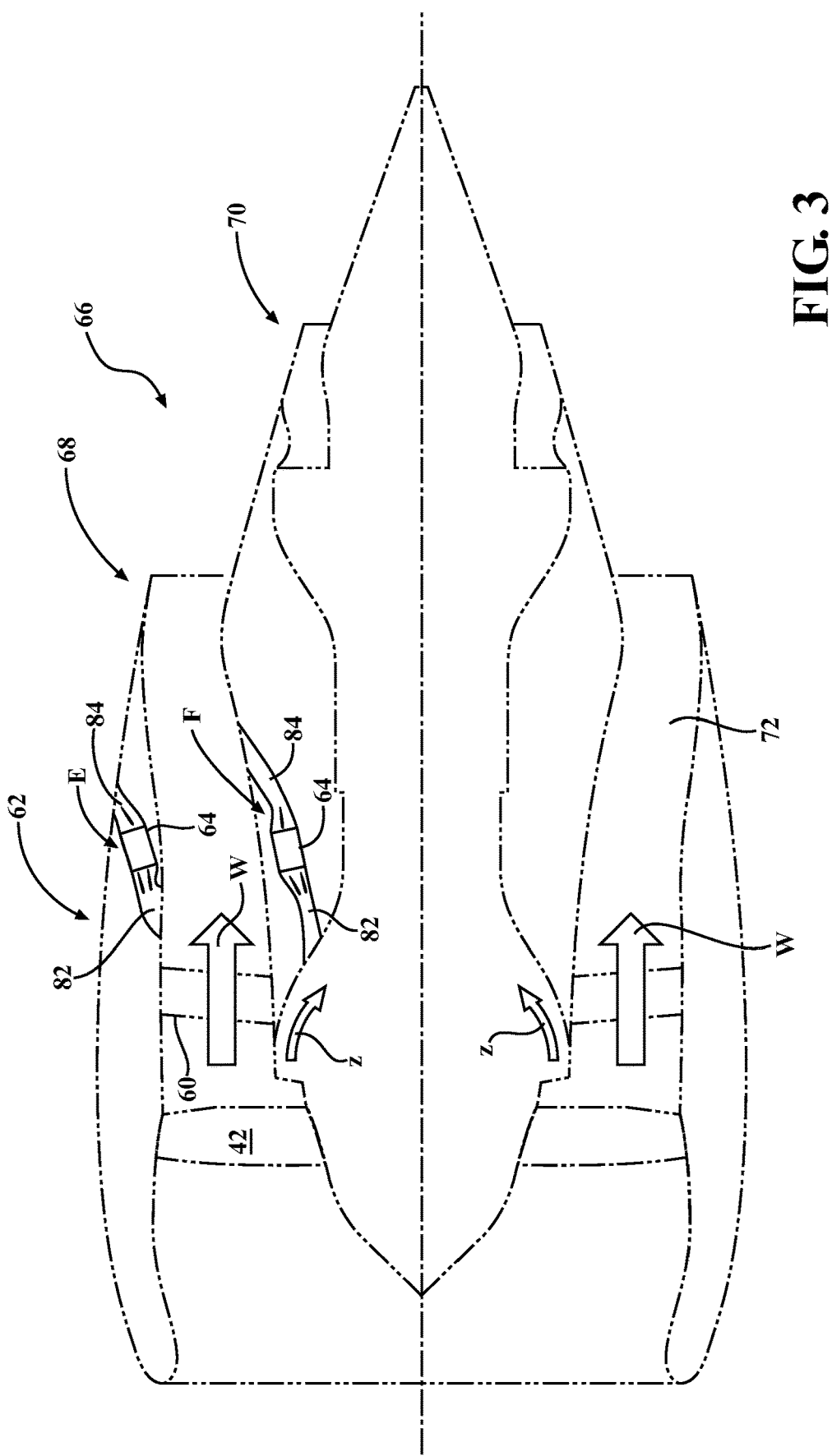
FIG. 3 is a schematic view of a nacelle assembly with a multiple of example locations for a ducted heat exchanger system that exchange flows with different air streams.

With reference to FIG. 3, the additive manufactured heat exchanger 64 may locate the inlet 82 and the exit 84 in communication with different air streams. For example, the additive manufactured heat exchanger 64 may be located within the fan nacelle 68 with the inlet 82 in communication with the bypass stream airflow through the fan bypass flowpath "W" and the exit 84 in communication with the free stream airflow (illustrated schematically as position E). Alternatively, the additive manufactured heat exchanger 64 may be located within the core nacelle 70 with the inlet 82 in communication with the core engine such as a stage of the LPC 44 and the exit 84 in communication with the bypass stream airflow (illustrated schematically as position F). It should be appreciated that various positions and flow paths may be alternatively, or additionally, provided. Further, the heat exchanger 64 may be utilized in other environments such as within an aircraft environmental control system.

Figure 4:
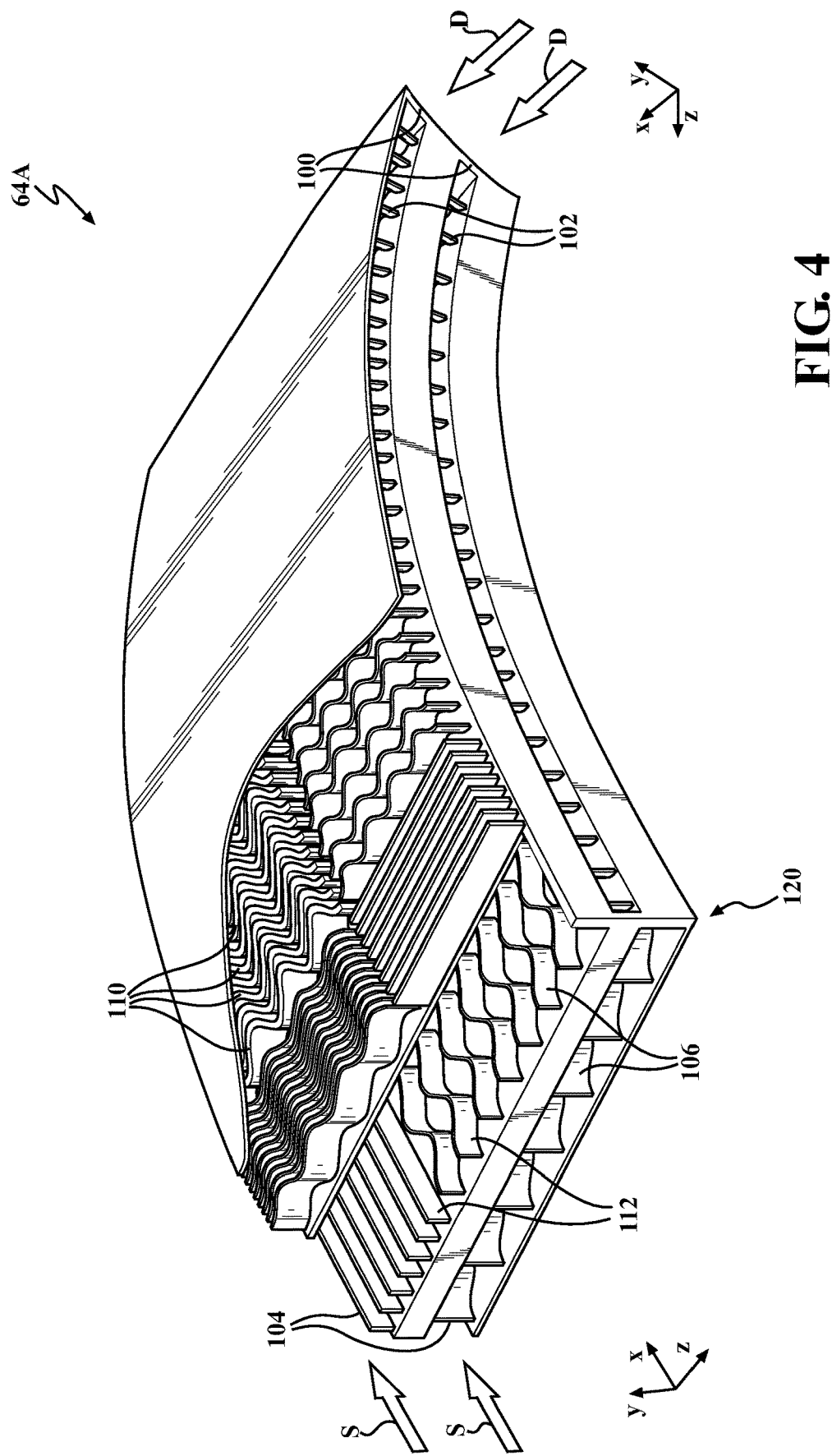
FIG. 4 a perspective partial sectional view of a heat exchanger according to one disclosed non-limiting embodiment.

With reference to FIG. 4, the additive manufactured heat exchanger 64A in one disclosed non-limiting embodiment includes a first plurality of flow passages 100 (two shown) formed between curved plates. Each flow passage 100 includes a plurality of heat transfer surfaces 102 arranged to form multiple flow passages for a first fluid (illustrated schematically by arrows "D") that exchanges heat with a second fluid (illustrated schematically by arrows "S") that flows through a second plurality of flow passage 104 formed between curved plates with a second plurality of heat transfer surfaces 106. It should be appreciated that any number of layers may be additively manufactured to, for example, manufacture a 3-layer heat exchanger, i.e., 2 layers of flow passage 100 with 1 layer of flow passage 104.

Figure 5:
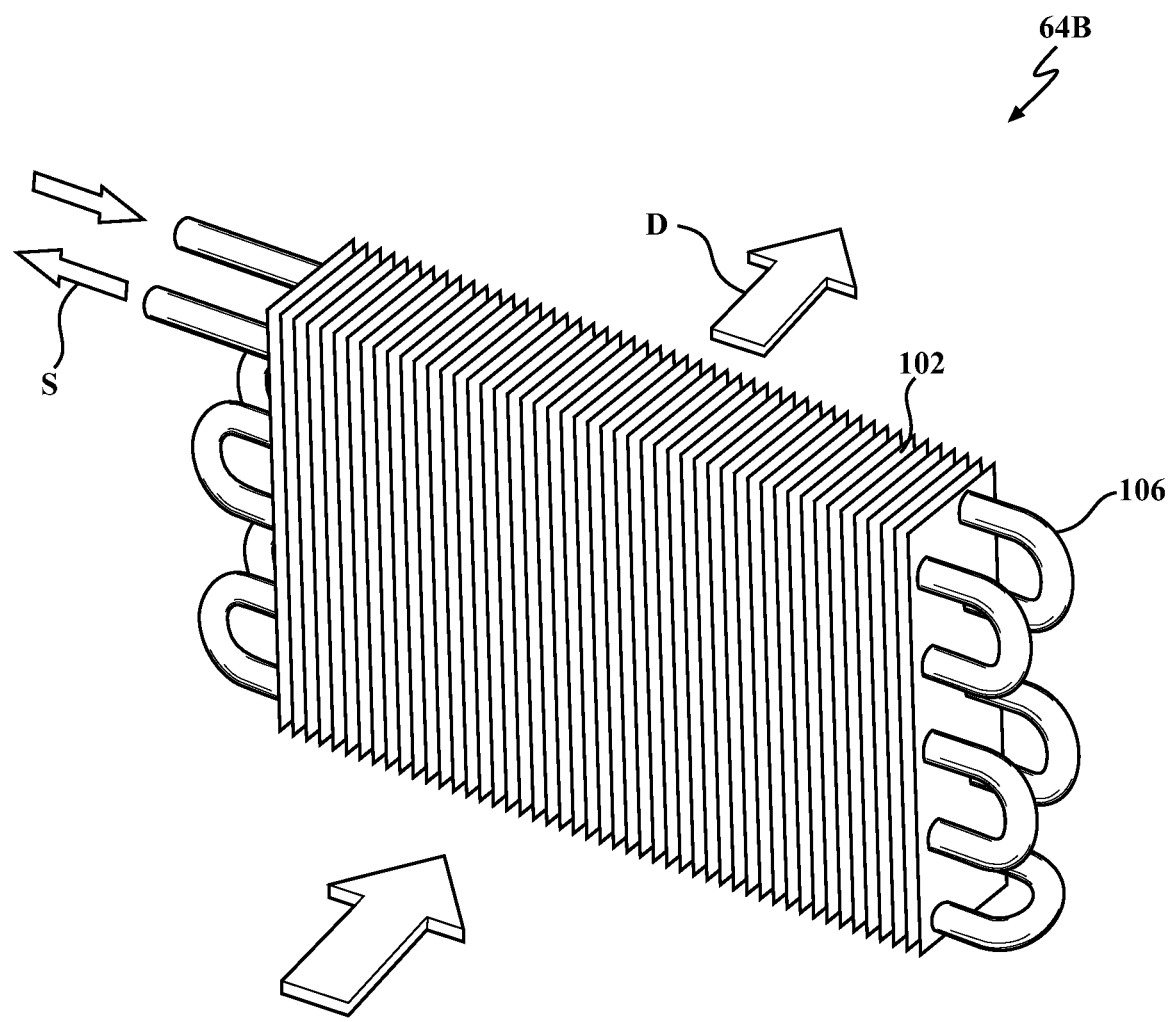
FIG. 5 is a perspective view of an example heat exchanger core according to another disclosed non-limiting embodiment.

Either or both of the first and second heat transfer surfaces 102, 106 may include fins, pins, tubes, and/or other surfaces. For example, the second plurality of heat transfer surfaces 106 may include tubes that extend through fin type heat transfer surfaces 102 of a heat exchanger 64B (FIG. 5). The fluid streams "D", "S" can be alternatively or additionally arranged in a cross flow, counter flow, parallel flow, or cross contra/parallel flow arrangement. The fluids may include two or more fluid streams such as air, oil, fuel, exhaust gas, refrigerants, glycol, water, hydraulic fluids such as polyalphaole heat transfer surfaces [PAO], dielectric fluids such as FC 72, and other fluids that can exchange heat.

In one disclosed non-limiting embodiment, the heat transfer surfaces 102, 106 are arranged to define a height characteristic and a row characteristic such that and a direction perpendicular to the height characteristic and the row characteristic generally defines a fluid flow direction. In other words, the airflow direction, the height direction and the row direction correspond to X direction, Y direction and Z direction, respectively, for each set of passages 100, 104.

Figure 6:
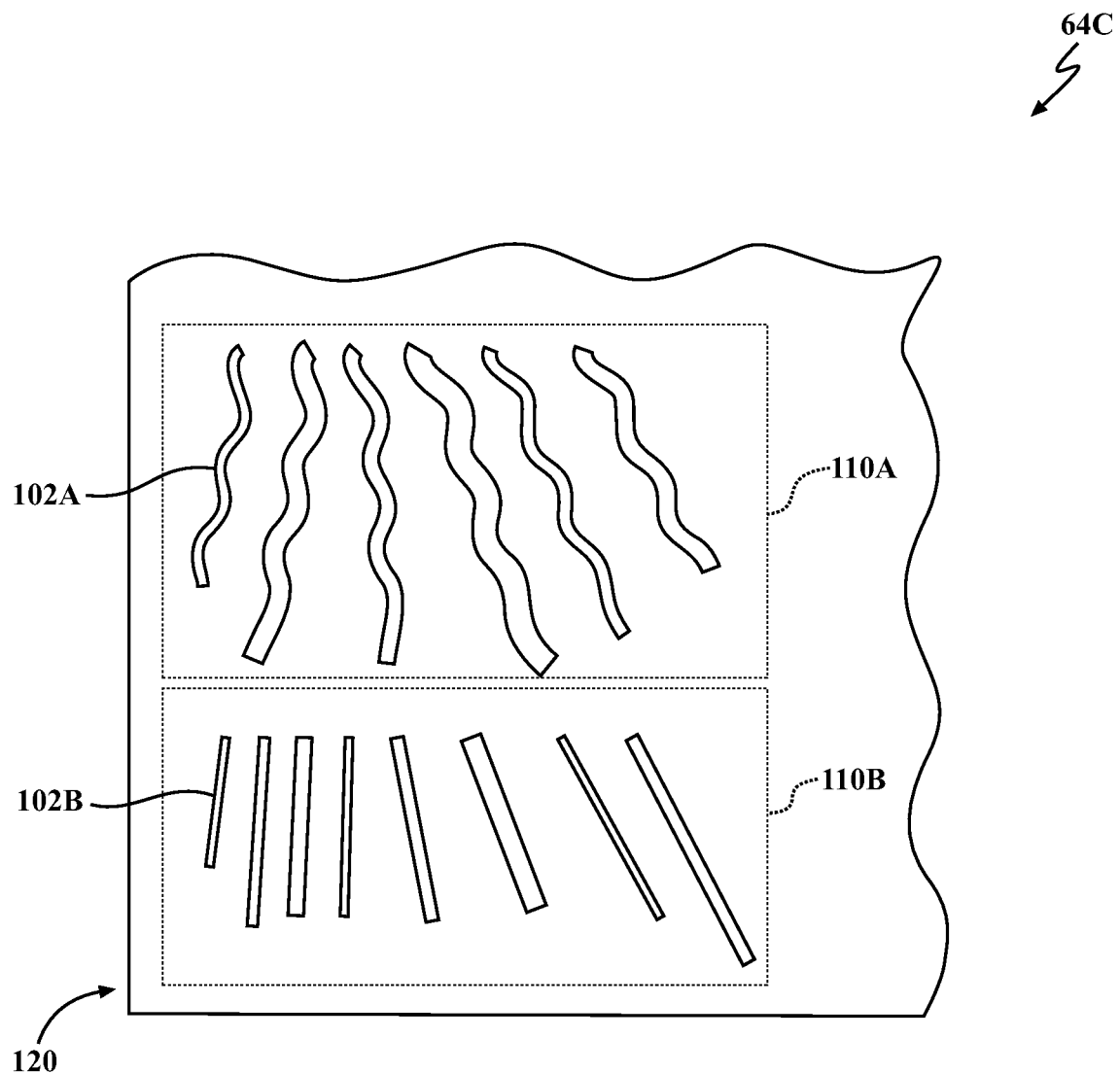
FIG. 6 is a top sectional view of heat exchanger with a multiple of sections.

In each flow passage 100, 104 the respective heat transfer surfaces 102, 106 are spatially varied and may be formed in a plurality of sectors 110, 112. In other words, the heat transfer surfaces 102, 106 may be arranged at a non-constant spacing to form a heat transfer surface pitch FP dependent at least in part on their position. That is, the spacing between two adjacent heat transfer surfaces 102, 106 in one or more of the various sectors 110, 112 need not be constant and may vary as compared to another sector 110, 112. In other words, one sector 110A may include low aspect ratio heat transfer surfaces while another sector 110B includes a high aspect ratio (FIG. 6). Further, the heat transfer surfaces, 102, 106 within each sector 110, 112 of various characteristics such as a height, thickness, aspect ratio, number, shape, etc. Although the sectors 110, 112 are discretely defined in the illustrated embodiments, it should be appreciated that the sectors may be contiguous or otherwise blended.

With continued reference to FIG. 4, in one example, the largest thermal gradient may be in each corner sector 120 such that the heat transfer surfaces 102, 106 in the corner may be relatively thick and require a relatively high heat transfer surface count per unit of length. Such heat transfer surface arrangement also increases the mechanical strength thereof. That is, the corner sector 120 may include low aspect ratio heat transfer surfaces, e.g., short and fat wavy heat transfer surfaces that are closely spaced. Alternatively, a relatively low fin density with a relatively low heat transfer surface may be located in one or more corner sectors 120 to reduce the rate of thermal change to mitigate thermal stresses. Alternatively, or in addition, one or more of the heat transfer surfaces 102, 106 may include characteristics that provide structural support in particular areas such as the corner sector 120.

Figure 7:
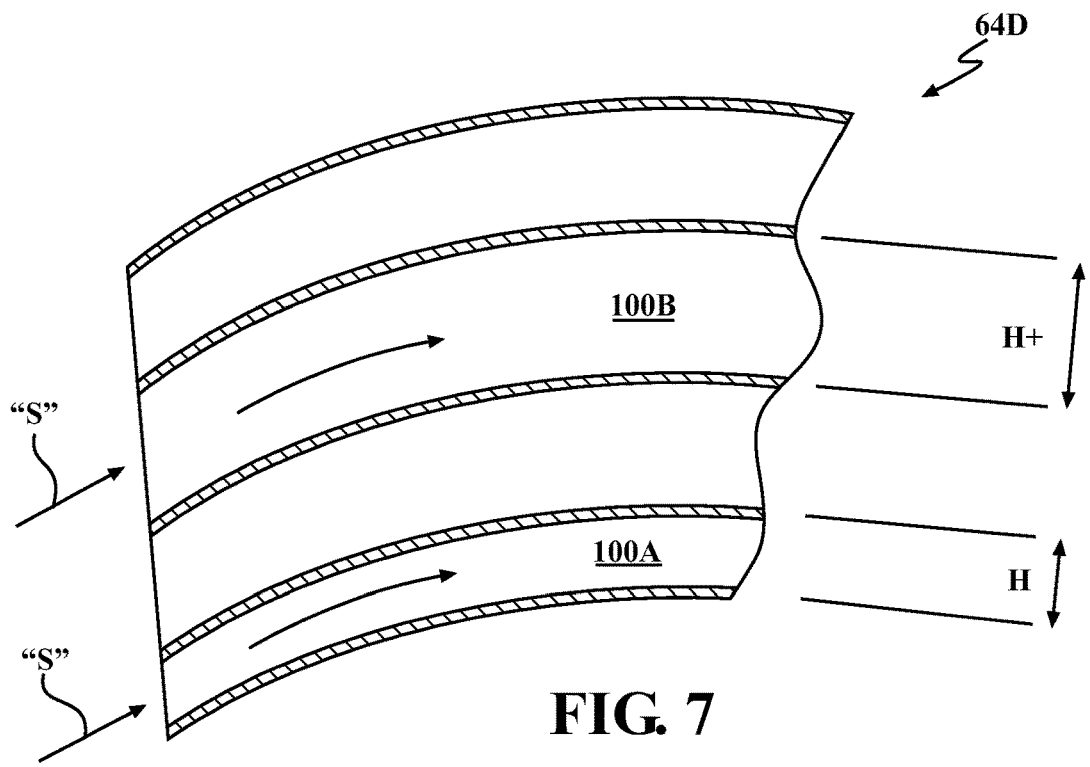
FIG. 7 is a sectional view of a heat exchanger system according to another disclosed non-limiting embodiment.

With reference to FIG. 7, an additive manufactured heat exchanger 64D according to another disclosed non-limiting embodiment provides different characteristics for each flow passage 100A, 100B, e.g., for a curved heat exchanger. In this example, a larger flow passage 100B a greater flow area such as by an increased channel height, a reduced heat transfer surface count, or combinations thereof to maintain a consistent flow rate through each heat exchanger core flow passage 100A, 100B, to facilitate heat exchanger performance and/or reduce heat exchanger size.

Figure 8:
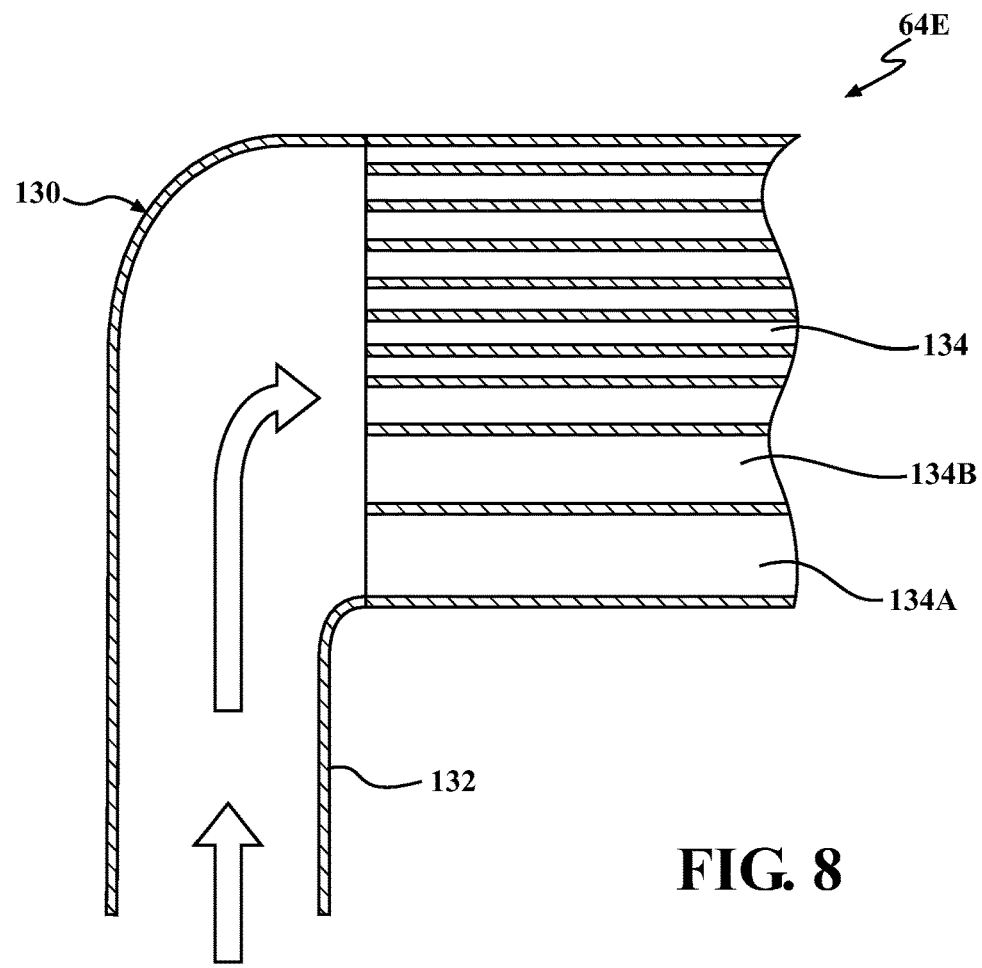
FIG. 8 is a sectional view of a heat exchanger system according to another disclosed non-limiting embodiment.

With reference to FIG. 8, an additive manufactured heat exchanger 64E according to another disclosed non-limiting embodiment, relatively large flow maldistributions may be formed in a plenum 130 if an inlet 132 and the flow passages 134 channels are not in the same direction, e.g., the airflow enters the plenum 130 perpendicular to the flow channel such that the first few flow channels may not receive effective airflow. The flow passages 134A, 134B closest to an inlet 130 are thus additively manufactured to be relatively larger than those downstream thereof to increase the flow. The flow channels are readily enlarged by additive manufacturing by, for example, a decrease in a characteristic of the heat transfer surfaces 102 such as by a decrease in a number thereof, an increase in height, and/or combinations thereof.

The characteristics of the heat transfer surfaces are varied throughout the heat exchanger to maintain high heat transfer and low pressure drop. The characteristics such as heat transfer surface type, spacing, diameter/thickness, height, geometry, etc., may be arranged to accommodate non-uniform flow distribution entering, flowing through, and exiting the heat exchanger system 64. Additionally, the heat transfer surface characteristics can be varied based on the local temperature difference between the two fluids to minimize the pressure drop for a given amount of heat transfer. Shaped heat transfer surfaces can also be used to minimize the pressure drop in a turn portion of internally finned multi-pass heat exchangers.

The heat transfer surfaces 102 are readily manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF).

The additive manufacturing process sequentially builds-up flow passages of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of the relatively complex geometry to minimize assembly details and multi-component construction as the additive manufacturing process fabricates or "grows" components using three-dimensional information, for example a three-dimensional computer model. The additive manufactured component is then "grown" slice by slice, or flow passage by flow passage.

Additively manufacturing spatially varied heat transfer surfaces thereby facilitate maintenance of a consistent flow rate through the heat exchanger system to minimize the pressure drop therethrough irrespective of a shape of the heat exchanger system.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A heat exchanger system for an engine nacelle of a gas turbine engine, comprising:
   an additively manufactured curved heat exchanger that comprises a first of a multiple of heat exchanger core flow passages formed between curved plates, a second of the multiple of heat exchanger core flow passages formed between curved plates radially outboard of the first of the multiple of heat exchanger core flow passages, the cross-sectional area of the second of the multiple of heat exchanger core flow passage defining a larger flow passage cross-sectional area than the cross-sectional area of the first of the multiple of heat exchanger core flow passages to maintain a consistent flow rate through each of the multiple of heat exchanger core flow passages during operation, and wherein the longitudinal axis of the first of the multiple of heat exchanger core flow passages is parallel to the longitudinal axis of the second of the multiple of heat exchanger core flow passages.

2. The heat exchanger system as recited in claim 1, wherein each of the multiple of heat exchanger core flow passages radially outboard of an adjacent one of the multiple of heat exchanger core flow passages, defines a larger flow passage than the adjacent one of the multiple of heat exchanger core flow passages.

3. The heat exchanger system as recited in claim 1, further comprising a plurality of additively manufactured heat transfer surfaces in a plurality of sectors within each of the multiple of heat exchanger core flow passages.

4. The heat exchanger system as recited in claim 3, wherein the heat transfer surfaces are fins.

5. The heat exchanger system as recited in claim 3, wherein the heat transfer surfaces extend from the curved plates.

6. The heat exchanger system as recited in claim 1, further comprising a plurality of additively manufactured heat transfer surfaces in a corner sector within each of the multiple of heat exchanger core flow passages.

7. The heat exchanger system as recited in claim 6, wherein the plurality of additively manufactured heat transfer surfaces have an aspect ratio which is lower than the aspect ratio of a non-corner sector.

8. The heat exchanger system as recited in claim 6, wherein the plurality of additively manufactured heat transfer surfaces have a fin density which is lower than the fin density of a non-corner sector.

9. The heat exchanger system as recited in claim 1, wherein the plurality of additively manufactured heat transfer surfaces in the corner sector provide structural support for the curved plates.

10. The heat exchanger system as recited in claim 1, wherein the additively manufactured curved heat exchanger is located within a duct in the nacelle.

* * * * *